United States Patent [19]

Kobayashi et al.

[11] 4,130,390
[45] Dec. 19, 1978

[54] INSTALLATION AND METHOD OF BURNING CEMENT RAW

[75] Inventors: Toshihiro Kobayashi, Tokyo; Tadaaki Saika, Yokohama, both of Japan

[73] Assignee: Ishikawajima-Harima Jukogyo Kabushiki Kaisha, Ote, Japan

[21] Appl. No.: 793,605

[22] Filed: May 4, 1977

[30] Foreign Application Priority Data

May 12, 1976 [JP] Japan .................................. 51-54561

[51] Int. Cl.² ........................... F27B 15/00; F27B 7/02
[52] U.S. Cl. ........................................ 432/14; 432/106
[58] Field of Search ..................... 432/14, 15, 58, 106; 106/100

[56] References Cited

U.S. PATENT DOCUMENTS

| 3,904,353 | 9/1975 | Bosshard et al. | 432/14 |
| 3,914,098 | 10/1975 | Kano et al. | 432/106 |

Primary Examiner—John J. Camby
Attorney, Agent, or Firm—Scrivener, Parker, Scrivener & Clarke

[57] ABSTRACT

Extensive improvements in the production capability of the existing installations of the type comprising a rotary kiln and a suspension preheater unit are disclosed; that is, another suspension preheater unit provided with a calciner at its lowermost heat transfer stage and a distributor to direct a part of the preheated raw materials from the existing preheater to the calciner are installed, and all the raw materials supplied to two preheater units are uniformly and highly calcined ahead of the kiln in the preheaters by control of the distributor as well as the fuel rate to the calciner, thereby the production capacity of the kiln is doubled. Furthermore the accumulation of raw materials on the bottom of the calciner can be substantially eliminated and the specific power consumption of the installations may be reduced.

2 Claims, 3 Drawing Figures

INSTALLATION AND METHOD OF BURNING CEMENT RAW

DETAILED DESCRIPTION OF THE INVENTION

In recent years, the kiln installations with a suspension preheater unit have led to wide-spread acceptance for burning cement raw materials into portland cement clinker.

Figure 1:
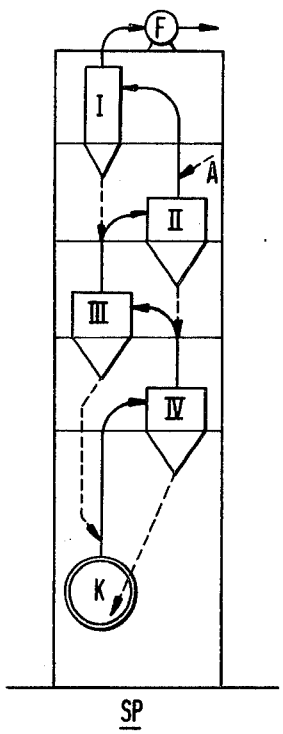

The suspension preheater unit SP generally consists of four stages of heat exchange cyclones I, II, III and IV as shown in FIG. 1, and the exhaust gases discharged from a rotary kiln K flow through the cyclones IV; III, II and I in order to transfer their heat to raw materials being charged to the preheater from a feed port A. The preheated raw materials are fed into the rotary kiln K from the cyclone IV which is located nearest to the rotary kiln K.

The suspension preheater unit SP of the type described has a disadvantage that when the temperature of exhaust gases from the rotary kiln K exceeds 1,200° C., a large amount of coating adheres to gas ducts connecting the kiln K and the cyclone IV and/or the raw materials in the cyclone IV and the material chute from the cyclone IV to the kiln K becomes adhesive to stop their flow, thereby interfering with the operation.

Because of such limit of the gas temperature discharged from the rotary kiln K, preheating of the raw materials and only 40% of their calcination (decarboxylation) is attained as the maximum for the conventional preheater unit SP. As a consequence, the remaining 60% of the raw material calcination must take place in the rotary kiln K. Since the calcining reaction of raw materials requires more than one half of the heat consumed in the manufacturing process of portland cement clinker, the rotary kiln provided with the suspension preheater unit SP shown in FIG. 1 cannot exhibit a high production capability due to its 60% burden of the calcining reaction.

Figure 2:
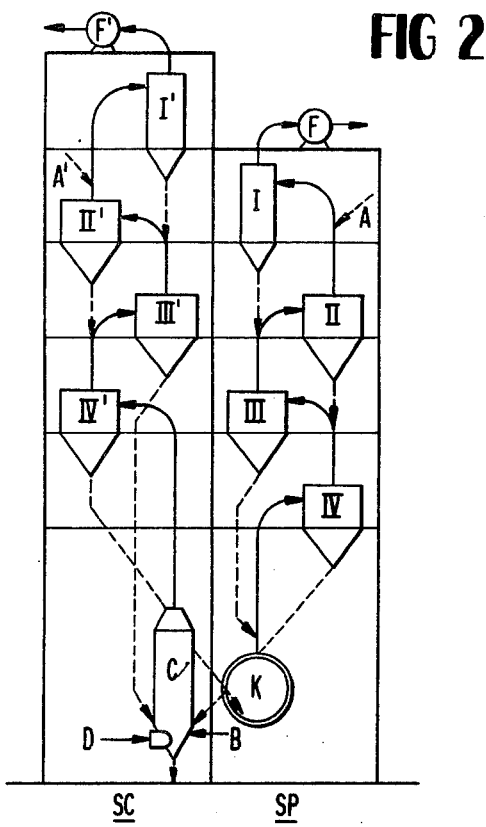

To solve the above problem there has been devised and demonstrated a suspension preheater system with a calciner wherein raw materials are largely calcined ahead of the kiln K in the preheater unit. One example of the prior art installations is shown in FIG. 2 wherein there is provided a suspension preheater unit SC consisting of a calcining stage IV' incorporating a calciner C and three heat-exchanger stages I', II' and III' for preheating the raw materials with the exhaust gases discharge from a cyclone IV' in addition to the conventional suspension preheater unit of the type shown in FIG. 1. Raw materials being charged into the additional preheater SC through a feed port A' are gradually heated to higher temperatures as they flow down through cyclone heat-exchangers I', II' and III' in the order and then the preheated raw materials are fed into a calciner C. Together with fuel supplied by a burner B the raw materials preheated and partially calcined in the suspension preheater unit SP are also introduced from its last stage cyclone IV into the calciner C.

Combustion air preheated by the heat exchange with high temperature clinker in a clinker cooler (not shown) is led through a duct D into the calciner C to form a turbulent vortex flow with suspended raw material particles. Thus, mixing and dispersion of the raw materials and atomized fuel particles take place in the calciner. As the fuel particles are burnt, the developed heat is transferred to the raw material particles instantaneously and the highly calcined raw materials are sent into the rotary kiln K from the calcining stage IV'.

With the suspension preheater with a calciner of the type described above, the heat to be transferred into the rotary kiln K for the calcination of raw materials may be significantly reduced and as a result the production capability of the rotary kiln K is remarkably increased. However, to raise the kiln throughout two times as much as that of the rotary kiln installations with the conventional suspension preheater unit SP, all raw materials need to be calcined up to 85 to 95% before they are fed into the rotary kiln K. Accordingly, the raw materials which have been preheated and 40% precalcined in the preheater unit SP with the exhaust gases from the rotary kiln K must be further treated in the calciner C of the suspension preheater unit SC in order to increase the calcination rate.

However, raw materials heated to about 800° C., become adhesive so that a material chute for feeding them from the lowermost cyclone IV in the suspension preheater unit SP to the calciner C must be inclined at least 55° to 60° and consequently the material entrance of the calciner C will be physically located at a lower elevation than that of the rotary kiln K.

Moreover, it is difficult to suspend all of the material particles fed into the calciner in the gases and therefore a small amount of raw materials may accumulate at the bottom of the calciner C. When the deposit of raw materials is left for a long time, it will agglomerate and be hard and may plug up the passages of combustion air so that it must be continuously or intermittently discharged out of the calciner C.

Occasionally, material discharge of the cyclone IV in the preheater unit SP and/or the cyclone III' in the preheater unit SC may be clogged due to the high adhesive characteristics of the materials, and when the clogged materials are cleaned out, a large amount of raw materials is at once fed into the calciner C and form deposits at its bottom to plug up the air passages. With the preheater units SC and SP shown in FIG. 2, the raw materials which have been accumulated at the calciner bottom cannot be returned either to the preheater units SC and SP or to the rotary kiln by its gravity flow. As a consequence they must be discharged out of the calciner C and cooled before they are returned again into the process. To this end complex devices and equipment are required.

The present invention relates to the installation and method of burning cement raw materials which are capable of doubling the production capability of an existing kiln installation with a conventional suspension preheater unit SP as shown in FIG. 1. Furthermore the present invention was made to avoid the operational troubles caused by the accumulated raw materials at the bottom of the calciner C which had occurred in the prior art kiln installation with two preheater units SP and SC as shown in FIG. 2 and at the same time to further reduce the draft resistance of the preheater units in the said installations, thereby saving the power consumption of the exhaust gas fans.

Figure 3:
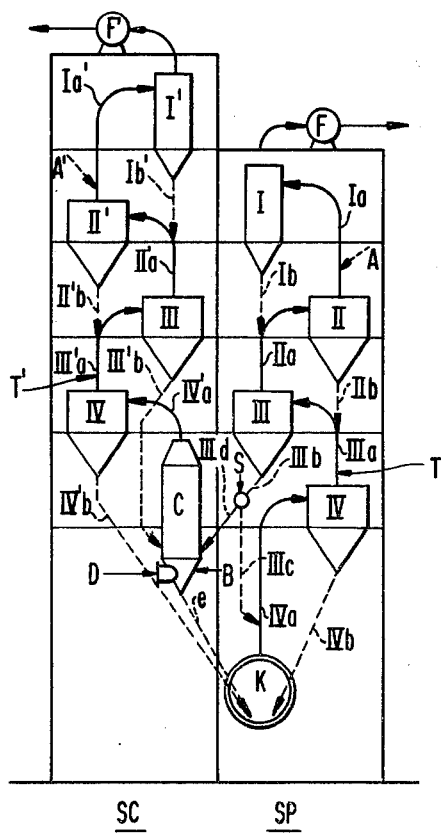

The present invention will become more apparent from the following description of one preferred embodiment thereof taken in conjunction with the accompanying drawing, in which:

FIG. 1 schematically shows a conventional art suspension preheater unit SP;

FIG. 2 schematically shows a suspension preheater unit SC with a calciner in addition to the preheater unit SP shown in FIG. 1; and FIG. 3 schematically shows a cement manufacturing installation in accordance with the present invention.

Referring to FIG. 3, in the suspension preheater unit SP reference numerals I, II, III and IV denote cyclones interconnected through gas ducts Ia, IIa and IIIa, and cyclones I, II and III constitute a three-stage preheater unit. The rotary kiln K is connected through a gas duct IVa to cyclone IV, enabling gases from the kiln K to flow to cyclone IV and thence through gas duct IIIa, cyclone III, gas duct IIa, cyclone II, gas duct Ia and cyclone I, to discharge through an exhaust gas fan F. In the same manner, in the suspension preheater unit SC, reference numerals I', II', III' and IV' denote cyclones interconnected through gas ducts Ia', IIa' and IIIa', and cyclones I', II' and III' constitute another three-stage preheater unit. Calciner C is connected through a gas duct IVa' to cyclone IV', enabling gases from calciner C to flow to cyclone IV', and thence through gas duct IIIa', and cyclone III', gas duct IIa', cyclone II', gas duct Ia' and cyclone I, to discharge through an exhaust gas fan F'. A duct D is provided in order to direct the combustion air from the clinker cooler (not shown) into the calciner C tangentially.

In addition to the above units there are provided raw material feed ports A and A' for feeding the materials into the gas ducts Ia and Ia' respectively and material chutes Ib, Ib', IIb and IIb' for feeding into the gas ducts IIa, IIa', IIIa and IIIa' the materials separated and collected in the cyclones I, I', II and II' respectively: a material chute IIIb' for feeding into the calciner C the materials separated and collected in the cyclone III'.

The construction described above is substantially similar to that of the preheater installations shown in FIG. 2, but according to the present invention the following improvements are made.

First, a material chute IIIb is provided to feed the raw materials separated in the cyclone III in the preheater unit SP into a distributor S, and one of the two discharges of the distributor S is connected with the duct IVa through a chute IIIc and the other with the calciner C through a chute IIId. Furthermore, the raw materials separated in the cyclone IV are fed through a material chute IVb into the rotary kiln K whereas those separated in the cyclone IV' are also fed through a material chute IVb' into the rotary kiln K, and those discharged from the bottom of the calciner C are sent through a material chute e into the kiln K.

Next, the mode of operation of the system with the above construction will be described. Pulverized raw materials are fed downward through the feed ports A and A' into the ducts Ia and Ia', respectively, so that the raw materials are suspended in the upward gas flow and carried into the cyclones I and I'. In the cyclones I and I', the raw materials separated from the exhaust gas are fed into the gas ducts IIa and IIa' through the chutes Ib and Ib', respectively.

As the raw materials in the preheater unit SP flow down through the gas duct IIa, the cyclone II, the material chute IIb, the gas duct IIIa and the cyclone III in that order, they are preheated stage by stage by the heat exchange with gases of a higher temperature. In like manner, the raw materials in the preheater unit SC are also preheated by the heat exchange with the gases of a higher temperature before they are fed into the calciner C, as they flow down through the gas duct IIa', the cyclone II', the material chute IIb', the gas duct IIIa', the cyclone III' and the material chute IIIb' in that order.

The process for preheating the raw materials in three stages of heat exchange as described above is substantially similar to that of the prior art cement manufacturing installations as shown in FIG. 2, but according to the present invention, a part of the raw materials separated especially in the cyclone III is sent into the distributor S through the chute IIIb and by the function of the distributor a part of them is splitted and fed into the duct IVa through the chute IIIc and suspended in high-temperature exhaust gases discharged from the rotary kiln K. As a result of a lighter material load than that of the conventional preheater unit SP, they are heated and calcined to a higher level by the heat of kiln exhaust gas, and then the calcined raw materials are separated in the cyclone IV and fed into the rotary kiln k through the chute IVb.

The remaining raw materials from the distributor S are introduced into the calcinator C through the chute IIId together with the preheated raw materials from the cyclone III' being fed through the chute IIIb'. In the calciner C the fuel introduced by a fuel supply means B is mixed with the combustion air led through the duct D and burnt. As the fuel is burnt, the developed heat is transferred to the raw materials and they are calcined to substantially the same level as those in the gas duct IVa. The calcined raw materials are sent into the cyclone IV' through the duct IVa' and those separated in the cyclone IV' and fed into the rotary kiln K through the chute IVb'. A small amount of the raw materials accumulated on the bottom of the calciner C is also sent into the rotary kiln K through the chute e.

In order to double the output of the existing kiln installations with the conventional preheater unit SP by the additional installation of a preheater unit SC with the calciner C, about 40% of the fuel is burnt in the rotary kiln K while the remaining 60% is fed to the calciner, and the combustion air which has been preheated to 650° to 700° C. is supplied to the calciner C from the clinker cooler (not shown) through the duct D.

About 40% of all raw materials is fed through the feed port A into the preheater unit SP while the remaining 60%, into the preheater unit SC through the feed port A'. The feeds are preheated to about 720° C. as they flow down through the independent three-stage heat-exchangers. In the method of the present invention, however, the raw materials fed to the distributor S are splitted to the chutes IIIc and IIId at a ratio of 40:60. The portion of raw materials fed into the gas duct IVa in the preheater system SP is calcined almost 85% with the heat contained in exhaust gases at about 1,100° C. discharged from the rotary kiln K, and the temperature T of the exhaust gases after the heat-exchange becomes about 880° C. at the outlet of the cyclone IV.

The raw materials fed through the chutes IIId and IIIb' into the calciner C are calcined to the same level as the portion fed into the gas duct in the preheater unit SP by 60% of overall fuel supplied to it, and the temperature T' of the combustion gases after the heat exchange is substantially equal to the temperature T, i.e., 880° C. The heat energy of these gases leaving cyclones IV and IV' is effectively utilized for preheating the raw materials and the temperature of the gases becomes about 350° C. when discharged out of the preheater units.

The practical method of control of the system according to the present invention will now be described. The heat available to the suspension preheater system SP for preheating and calcining the raw materials fed to it is brought by the exhaust gases from the rotary kiln K and it is normally sufficient to accomplish the calcination of all raw materials to a level of about 40%. If a portion of the raw materials preheated in the above three stages I, II and III is introduced into the duct IVa by the adjustment of the distributor S, it is calcined to a higher level than 40%. Since the calcination rate depends upon the temperature in the calcination zone, the precalcination rate at the last stage of the preheater unit SP is optionally controlled by the adjustment of the distributor S so as to maintain the gas temperature T at the discharge of cyclone IV to a certain level. Normally 85% precalcined raw materials are discharged to the kiln K by keeping the gas temperature at 880° C. On the other hand, the calcination rate for the raw materials fed into the calciner C is controlled by the adjustment of fuel rate supplied by the means B so as to keep the gas temperature T' at the discharge of cyclone IV' to a certain level. Their precalcination rate to be discharged to the kiln K is constantly held at about 85% by keeping the gas temperature T' also at 880° C.

The quantity of combustion airs for the rotary kiln K and for the calciner C can be controlled independently by the draft of exhaust gas fans F and F', respectively, so as to maintain two combustion stages at the optimum conditions with the least excess air. In addition, the quantity of raw materials fed into the preheater units SP and SC may be controlled also independently by the adjustment of the weighing and feeding systems (not shown) provided ahead of the feed ports A and A' so as to keep temperatures of gases leaving the cyclones I and I' at the same level (approx. 350° C.). Thus, the thermal efficiency of two preheating units are always maintained in the same and highest levels.

It will be understood that the heat exchangers used in the present invention are not limited to the duct-cyclone type and that any suspension type heat exchangers wherein the raw materials are suspended in gases for heat exchange may be used. In addition the number of heat-exchange stages is not limited to four as shown in FIG. 3.

The advantages of the present invention are summerized here;

(1) The production capacity of the existing kiln installations with a suspension preheater unit SP of the conventional art can be doubled by the addition of a preheater unit SC with a calciner and without major modification to the existing installations.

(2) The calciner can be located to a high elevation suffucient to discharge any deposit at its bottom into the rotary kiln by the gravity of deposit. Therefore, neither occurs draft disturbance of the calciner due to the deposit of raw materials as to be seen in the system shown in FIG. 2 nor is there required a complicated device to discharge the deposit and return it to the process.

(3) The material load of the calciner is not so high as the prior art installations as per FIG. 2, since a part of the raw materials is fed into the kiln without passing through the calciner C. Therefore, reduced particle load of the calciner gas ensures more perfect entrainment of raw material particles into gases without causing deposit at the calciner bottom and brings less draft resistance for lifting up and carrying the raw materials into the cyclone IV'.

(4) The draft resistance of the preheater system SP is also reduced due to a lighter particle load in the last heat transfer stages IVa and IV. Together with the advantage of item 3 above, power consumption of the exhaust gas fans F and F' may be 10 to 15% lower than that of the prior art installations shown in FIG. 2.

(5) The raw materials fed to two preheater units SP and SC may be uniformly and highly calcined ahead of the kiln in a simple manner by the adjustment of the distributor S as well as the fuel rate to the calciner.

What is claimed is:

1. A method of burning cement raw materials comprising the steps of
   (a) feeding a part of cement raw materials into a first suspension preheater unit consisting of a plurality of series-connected heat-exchange stages to preheat the raw materials while feeding the remaining part of cement materials into a second suspension preheater unit consisting of a plurality of series-connected heat-exchange stages to preheat the raw materials,
   (b) directing all of the raw materials discharged from the second lowermost heat-exchange stage in said second preheater unit into a calciner, which constitutes the lowermost heat exchange stage in said second preheater unit and provided with fuel supply means, thereby calcining the raw materials,
   (c) sending a part of the raw materials discharged from the second lowermost heat-exchange stage in said first preheater unit into said calciner while feeding the rest of the materials to the lowermost heat-exchange stage in said first suspension preheater thereby calcining them, and
   (d) feeding the equally calcined raw materials from the lowermost heat-exchange stages in both said first and second suspension preheater units into a rotary kiln.

2. An installation for burning cement raw materials comprising
   (a) a first suspension preheater unit directly connected to the feed end of a rotary kiln and consisting of a plurality of series-connected and vertically spaced multiple heat-exchange stages,
   (b) a second suspension preheater unit incorporating a calciner with the fuel supply means at its lowermost stage consisting of a plurality of series-connected and vertically spaced multiple heat-exchange stages, said second preheater unit being arranged in parallel with said first preheater unit,
   (c) means for directing from one heat-exchange stage to the succeeding heat-exchange stage downward the pulverized cement raw materials being fed separately into the uppermost heat-exchange stages in both said first and second suspension preheater units,
   (d) means for sending the raw materials discharged from the lowermost heat-exchange stage of said first and second suspension preheater units to said rotary kiln,
   (e) a distributor for directing a part of the raw materials discharged from the second lowermost heat-exchange stage of said first suspension preheater unit into said calciner, and
   (f) means for discharging accumulated raw materials at the bottom of said calciner and for sending them into said rotary kiln.

* * * * *